(12) United States Patent
Othmer

(10) Patent No.: US 8,340,640 B2
(45) Date of Patent: Dec. 25, 2012

(54) TRANSCRIPTION SYSTEMS AND METHODS

(75) Inventor: Konstantin Othmer, Mountain View, CA (US)

(73) Assignee: Speechink, Inc., Los Altos, CA (US)

( * ) Notice: Subject to any disclaimer, the term of this patent is extended or adjusted under 35 U.S.C. 154(b) by 413 days.

(21) Appl. No.: 12/624,045

(22) Filed: Nov. 23, 2009

(65) Prior Publication Data

US 2011/0269429 A1 Nov. 3, 2011

(51) Int. Cl.
*H04M 1/725* (2006.01)
(52) U.S. Cl. ............ 455/412.1; 455/414.1; 455/414.4; 455/566; 704/235; 379/88.14; 379/142.14
(58) Field of Classification Search ............... 455/3.05, 455/412.1, 412.2, 413, 414.1, 414.4, 415, 455/418–420, 466, 517–521, 550.1, 556.1, 455/556.2, 563, 566, 567; 704/231, 235, 704/246, 251; 379/88.14, 88.19, 88.2, 93.15, 379/100.13, 142.14, 207.13
See application file for complete search history.

(56) References Cited

U.S. PATENT DOCUMENTS

| | | | |
|---|---|---|---|
| 7,310,517 B2 | 12/2007 | Wolff et al. | |
| 2006/0074623 A1* | 4/2006 | Tankhiwale | 704/1 |
| 2008/0198978 A1* | 8/2008 | Olligschlaeger | 379/85 |
| 2008/0273675 A1* | 11/2008 | Siminoff | 379/88.14 |
| 2009/0031245 A1* | 1/2009 | Brezina et al. | 715/781 |
| 2009/0119100 A1* | 5/2009 | Akella et al. | 704/235 |
| 2009/0124272 A1 | 5/2009 | White et al. | |
| 2009/0125295 A1 | 5/2009 | Drewes | |
| 2009/0234643 A1* | 9/2009 | Afifi et al. | 704/201 |
| 2009/0262907 A1* | 10/2009 | Arquette | 379/69 |
| 2009/0299743 A1* | 12/2009 | Rogers | 704/235 |
| 2010/0268534 A1* | 10/2010 | Thambiratnam et al. | 704/235 |

OTHER PUBLICATIONS

International Search Report dated Jul. 27, 2011 as received in related application No. PCT/US2010/057779.

* cited by examiner

*Primary Examiner* — Anthony Addy
(74) *Attorney, Agent, or Firm* — Maschoff Gilmore & Israelsen

(57) ABSTRACT

A communication device may participate in telephone calls. The communication device may allow a user to request transcription of a telephone call by prompting the user when the telephone call is completed. The communication device may display a call history user interface and, in response to a selection of a telephone call from the call history user interface, may request transcription of the selected telephone call. The communication device may include a dedicated transcription button that, when pressed, causes audio content of a telephone call to be sent to a transcription service. The communication device may display a preferences user interface via which a user may elect to have all incoming and outgoing telephone calls transcribed, all incoming and outgoing telephone calls to/from selected contacts transcribed, and/or have the communication device prompt the user about transcription when each telephone call is completed.

17 Claims, 4 Drawing Sheets

TRANSCRIPTION SYSTEMS AND METHODS

BACKGROUND

1. Field of the Invention

The present invention generally relates to telecommunication systems and in particular to transcription of telephone calls.

2. Background Technology

People use a variety of communication devices, such as personal computers, landline telephones, wireless telephones, PDAs, laptop computers, set-top boxes and other communication devices. Using these devices, people may communicate via voice calls; network-based instant connect communication sessions (often referred to as push-to-talk calls); email; SMS (Short Message Service) messages; EMS (Enhanced Messaging Service) messages; MMS (Multimedia Message Service) messages; voice messages (also referred to as instant voice messages, VoiceSMS messages and Vnotes® messages); podcasts; audio files; video files; and/or other types of communications.

While communication via telephone calls may be fast and convenient, it can be difficult to remember what was said during such calls.

SUMMARY

A communication device may participate in telephone calls. The telephone calls may be automatically recorded, for instance, by the communication device and/or a remote server. The recorded telephone call may be stored on the device, on a remote server and/or any other suitable location. A transcription service may transcribe the recorded telephone calls into text.

The communication device may facilitate this transcription in a variety of ways. The communication device may allow a user to request transcription of a telephone call by prompting the user when the telephone call is completed. The communication device may display a call history user interface and, in response to a selection of a telephone call from the call history user interface, may request transcription of the selected telephone call. The communication device may include a dedicated transcription button that, when pressed, causes audio content of a telephone call to be sent to a transcription service. The communication device may display a preferences user interface via which a user may elect to have all incoming and outgoing telephone calls transcribed, all incoming and outgoing telephone calls to/from selected contacts transcribed, and/or have the communication device prompt the user about transcription when each telephone call is completed. If desired, a website may be configured to also display the call history user interface and/or the preferences user interface.

For purposes of summarizing, some aspects, advantages and features of a few of the embodiments of the invention have been described in this summary. Some embodiments of the invention may include some or all of these summarized aspects, advantages and features. However, not necessarily all of (or any of) these summarized aspects, advantages or features will be embodied in any particular embodiment of the invention. Thus, none of these summarized aspects, advantages and features are essential. Some of these summarized aspects, advantages and features and other aspects, advantages and features may become more fully apparent from the following detailed description and the appended claims.

BRIEF DESCRIPTION OF THE DRAWINGS

The appended drawings contain figures of preferred embodiments to further clarify the above and other aspects, advantages and features. It will be appreciated that these drawings depict only preferred embodiments of the invention and are not intended to limit its scope. These preferred embodiments will be described and explained with additional specificity and detail through the use of the accompanying drawings in which.

DETAILED DESCRIPTION OF THE PREFERRED EMBODIMENTS

Figure 1:
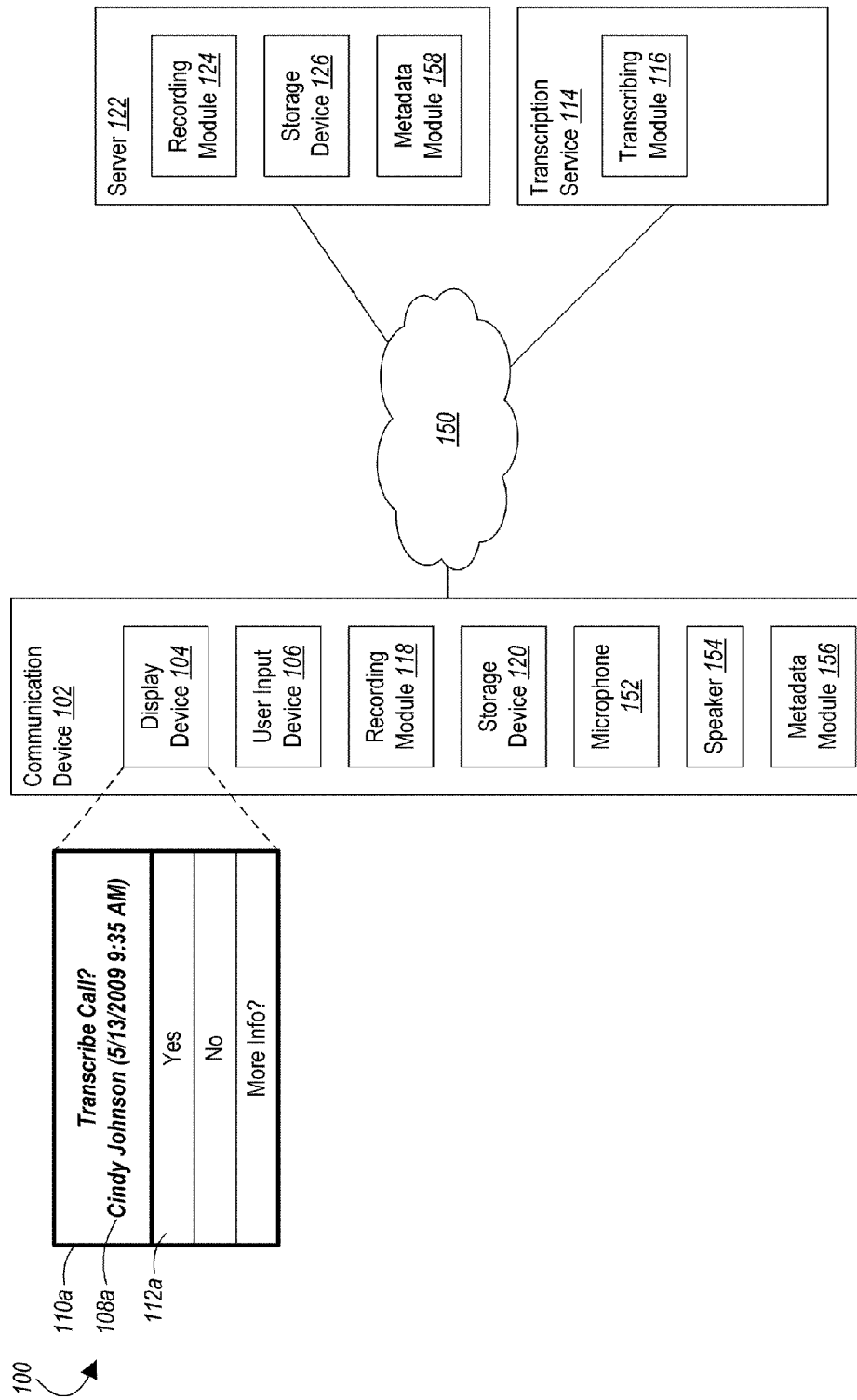
FIG. 1 is a diagram of an exemplary communications system, illustrating an exemplary user interface.

As shown in FIG. 1, a communications system 100 may include one or more communication devices 102, such as a communication device 102. In a preferred embodiment, the communication device 102 is a handheld wireless telecommunication device, such as a wireless telephone (e.g., a cellular telephone, a WiFi enabled phone or a satellite telephone) or other handheld telephony-enabled mobile device. Exemplary communication devices 102 may include, however, personal computers, landline telephones, wireless telephones, PDAs, laptop computers, set-top boxes and other communication devices. The communication devices 102 may be configured to communicate via telephone calls; network-based instant connect communication sessions (push-to-talk calls); email; SMS (Short Message Service) messages; EMS (Enhanced Messaging Service) messages; MIMS (Multimedia Message Service) messages; voice messages (also referred to as instant voice messages, VoiceSMS messages and Vnotes® messages); podcasts; audio files; video files; and/or other types of communications.

To facilitate this communication, the communication devices 102 may include, or be connected to, a display device 104 and/or a user input device 106. Exemplary display devices 104 may include LCDs, monitors, and other display devices. Exemplary user input devices 106 may include keyboards, keypads, buttons, click wheels, mice, mouse touch pads, mouse knobs, mouse balls, mouse roller wheels, touch-sensitive screens (such as touch screens, touch pads, and the like), microphones, video cameras, and other user input devices.

As shown in FIG. 1, the communication device 102 may participate in a telephone call 108a, such as an incoming telephone call, an outgoing telephone call, a conference call, a push-to-talk call or other type of telephone call. During or sometime after the telephone call 108a, the communication device 102 may automatically display a user interface 110a on its display device 104. For example, the communication device 102 may automatically display the user interface 110a in response to the telephone call being completed, e.g., terminated by one or more of the parties to the telephone call, terminated due to a loss or degradation of a wireless signal, etc.

The user interface 110a may be configured to prompt for user input that indicates a request for a transcription of some or all of the audio content of the telephone call 108a. For instance, a user may select a user interface element 112a to request a transcription of some or all of the audio content of the telephone call 108a.

In response to the user interface 110a receiving user input that indicates a request for a transcription of some or all of the audio content of the telephone call 108a, the audio content may be sent to a transcription service 114. For example, the transcription service 114 may include a server (not shown), and the audio content may have been recorded and stored as an audio file that may be sent to the transcription service's server. The server of the transcription service 114 may include a transcribing module 116 that may automatically transcribe the audio content into text. The transcription service 114, however, need not automatically transcribe the audio content automatically and could, for example, allow for manual transcription. Exemplary systems and methods for obtaining transcriptions of audio content are disclosed in U.S. Pat. No. 7,016,844, issued Mar. 21, 2006 and entitled "SYSTEM AND METHOD FOR ONLINE TRANSCRIPTION SERVICES," which is incorporated by reference herein in its entirety. The transcription service 114 may then send a file including the transcription to the user of the communication device 102, for instance, in an email addressed to an email address associated with the communication device 102. The transcription service 114, of course, could send the transcription to the user in any other suitable fashion.

To facilitate transcription, the telephone call 108a may be automatically recorded. For example, the communication device 102 may include a recording module 118 and a storage device 120, and the recording module 118 may be configured to automatically record and/or store some or all of the telephone call's audio content as an audio file in the storage device 120. Accordingly, the communication device 102 may send one or more audio files in the storage device 120 to the transcription service 114 in response to the user interface 110a receiving user input that indicates a request for a transcription of some or all of the audio content of the telephone call 108a. In another example, a server 122 remote from the communication device 102 may include a recording module 124 and a storage device 126, and the recording module 124 may be configured to automatically record and/or store some or all of the telephone call's audio content as an audio file in the storage device 126. Accordingly, the server 122 may send the audio file in the storage device 126 to the transcription service 114 in response to the user interface 110a receiving user input that indicates a request for a transcription of some or all of the audio content of the telephone call 108a.

The recorded audio content of the telephone call 108a may include outgoing audio content (e.g., audio that is received via a microphone 152 of the communication device 102 and then sent to the other communication devices that are participating in the telephone call) and/or incoming audio content (e.g., audio that the communication device 102 receives from the other communication devices that are participating in the telephone call and then plays on a speaker 154 of the communication device 102). Accordingly, a recording module 118, 124 may automatically record and/or store some or all of the outgoing and/or incoming audio as one or more audio files in a storage device 120, 126. The communication device 102 and/or the server 122 may then send the one or more audio files to the transcription server 114 in response to the user interface 110a receiving user input that indicates a request for a transcription of some or all of the audio content of the telephone call 108a.

For example, the recording module 118, 124 may record the outgoing audio content as a first audio file and/or may record the incoming audio content as one or more additional audio files (e.g., one additional audio file for all incoming audio content from the other communication devices that are participating in the telephone call; or multiple additional audio files—one audio file per other communication device, such that the audio content from each communication device is recorded into its own file).

Also, for example, the recording module 118, 124 may record the outgoing and incoming audio content as a single audio file. For instance, a stereo audio file may include a first channel and a second channel, and the recording module 118, 124 may record the outgoing audio content entirely or at least primarily in the first channel and may record the incoming audio content entirely or at least primarily in the second channel. Desirably, having the outgoing and incoming audio content separated into multiple audio files and/or channels may facilitate more accurate transcription because it may allow more accurate identification of which person is speaking.

Figure 2:
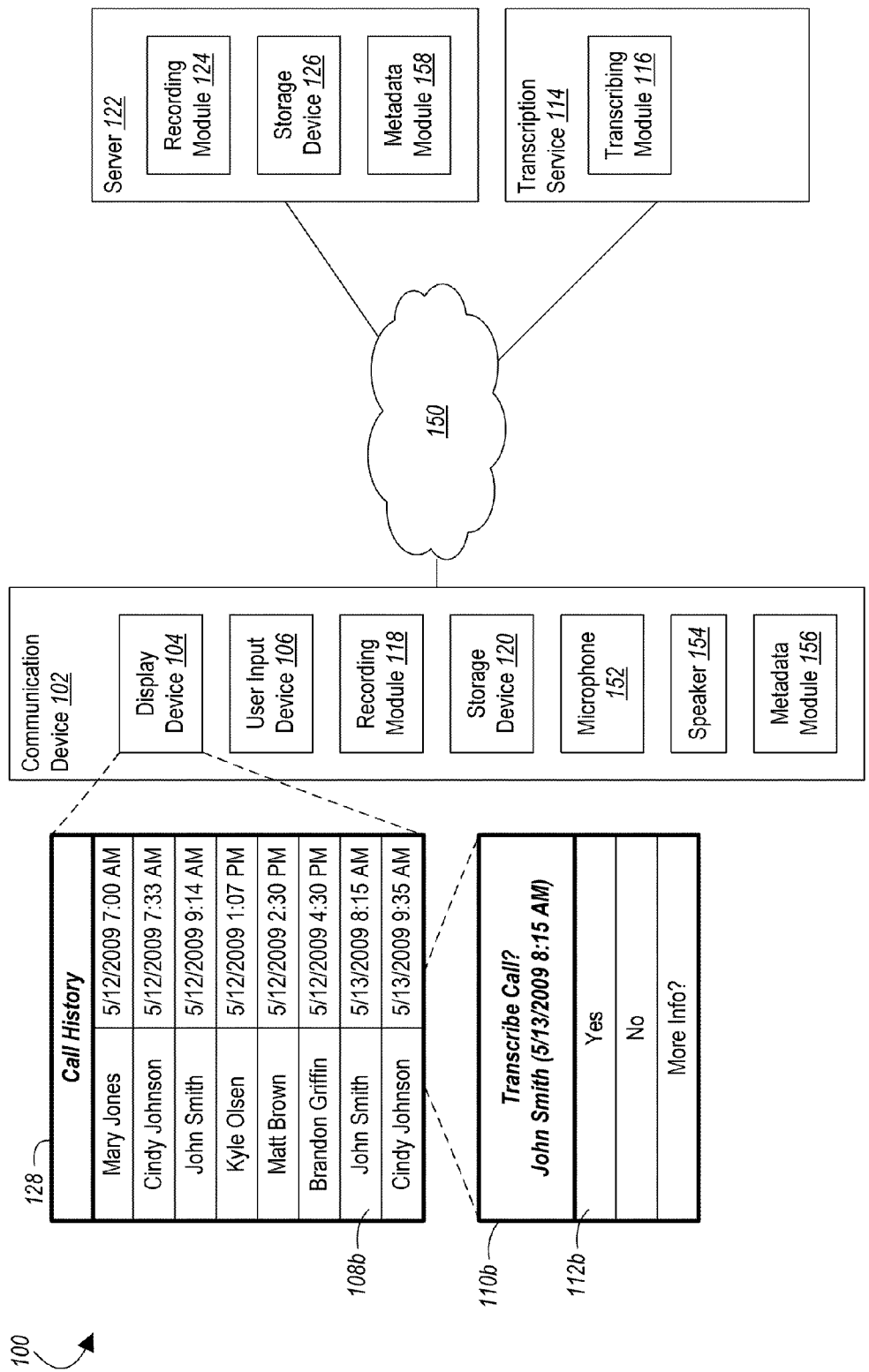
FIG. 2 is a diagram of the communications system shown in FIG. 1, illustrating another exemplary user interface.

As shown in FIG. 2, the communication device 102 may participate in a telephone call 108b, and sometime after the telephone call 108b, the communication device 102 may display a user interface 110b on its display device 104. The user interface 110b may be configured to prompt for user input that indicates a request for a transcription of some or all of the audio content of the telephone call 108b. For instance, a user may select a user interface element 112b to request a transcription of some or all of the audio content of the telephone call 108b. Like above, the audio content may be sent to a transcription service 114 in response to the user interface 110b receiving user input that indicates a request for a transcription, and like above, the telephone call 108b may be automatically recorded to facilitate transcription.

As shown in FIG. 2, the communication device 102 may be configured to display a call history user interface 128 on its display device 104. The call history user interface 128 may list one or more telephone calls in which the communication device 102 participated (e.g., incoming calls, outgoing calls, conference calls). This list includes the telephone call 108b. The communication device 102 may display the user interface 110b in response to a selection of the telephone call 108b from the call history user interface 128. If desired, a server remote from the communication device 102 (e.g., the server 122 or another server) may host a website or other type of web-based interface that includes the user interface 110b and/or the user interface 128. Accordingly, the user interface 110b and/or the user interface 128 may be displayed in a display device of a computing device or other web-enabled device.

Figure 3:
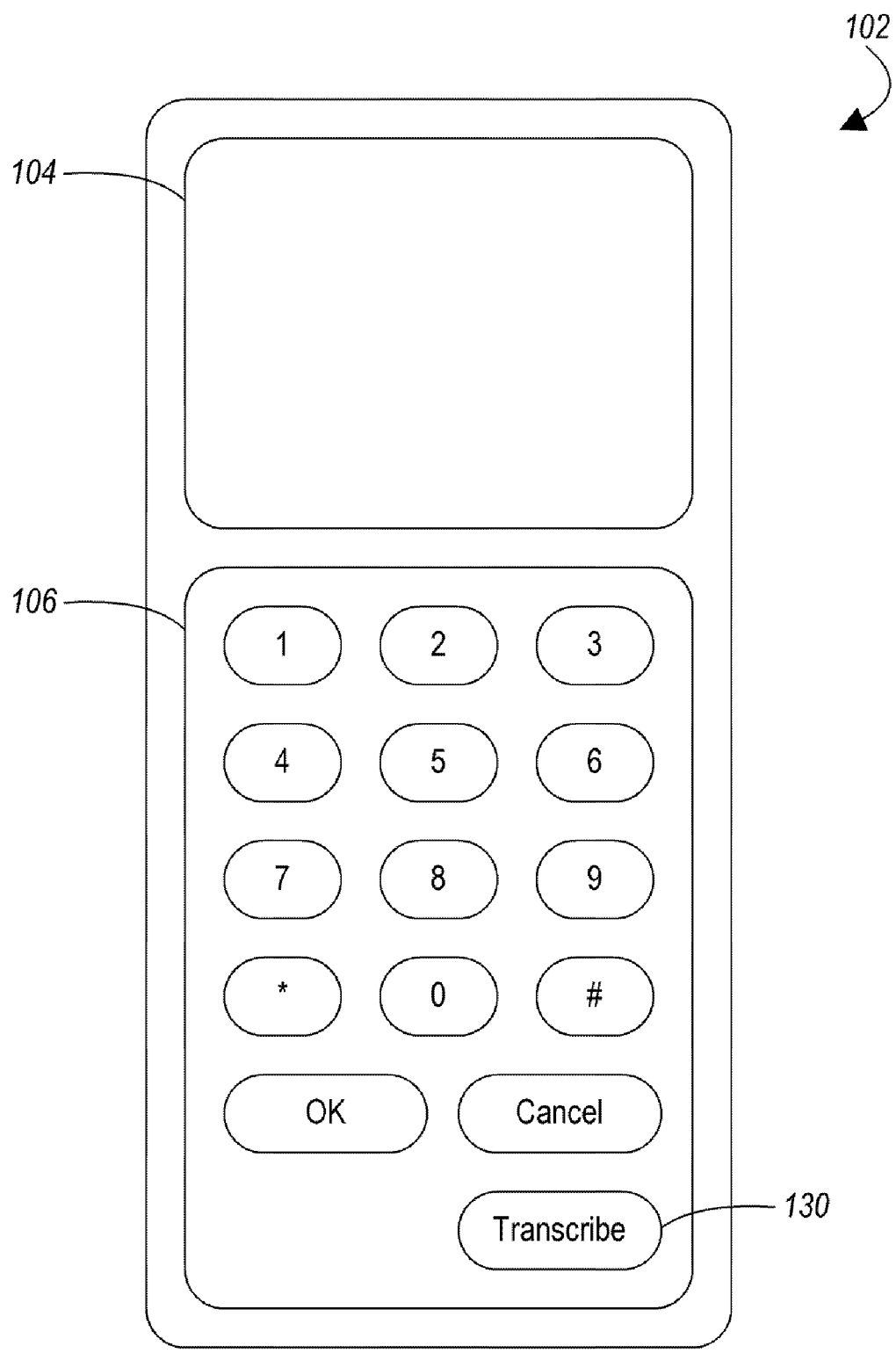
FIG. 3 is a diagram of an exemplary communication device.

In one embodiment shown in FIG. 3, the communication device 102 may comprise a handheld wireless telecommunication device that may include a dedicated transcription button 130. When the dedicated transcription button 130 is pressed with a telephone call in the call history user interface 128 (FIG. 2) being highlighted, it may cause audio content of the highlighted telephone call to be sent to the transcription service 114, like above. In another example, when the transcription button 130 is pressed during a telephone call or immediately after a telephone call is completed, it may cause audio content of the telephone call to be sent to the transcription service 114, like above. Also, like above, the telephone call may be automatically recorded to facilitate transcription.

Figure 4:
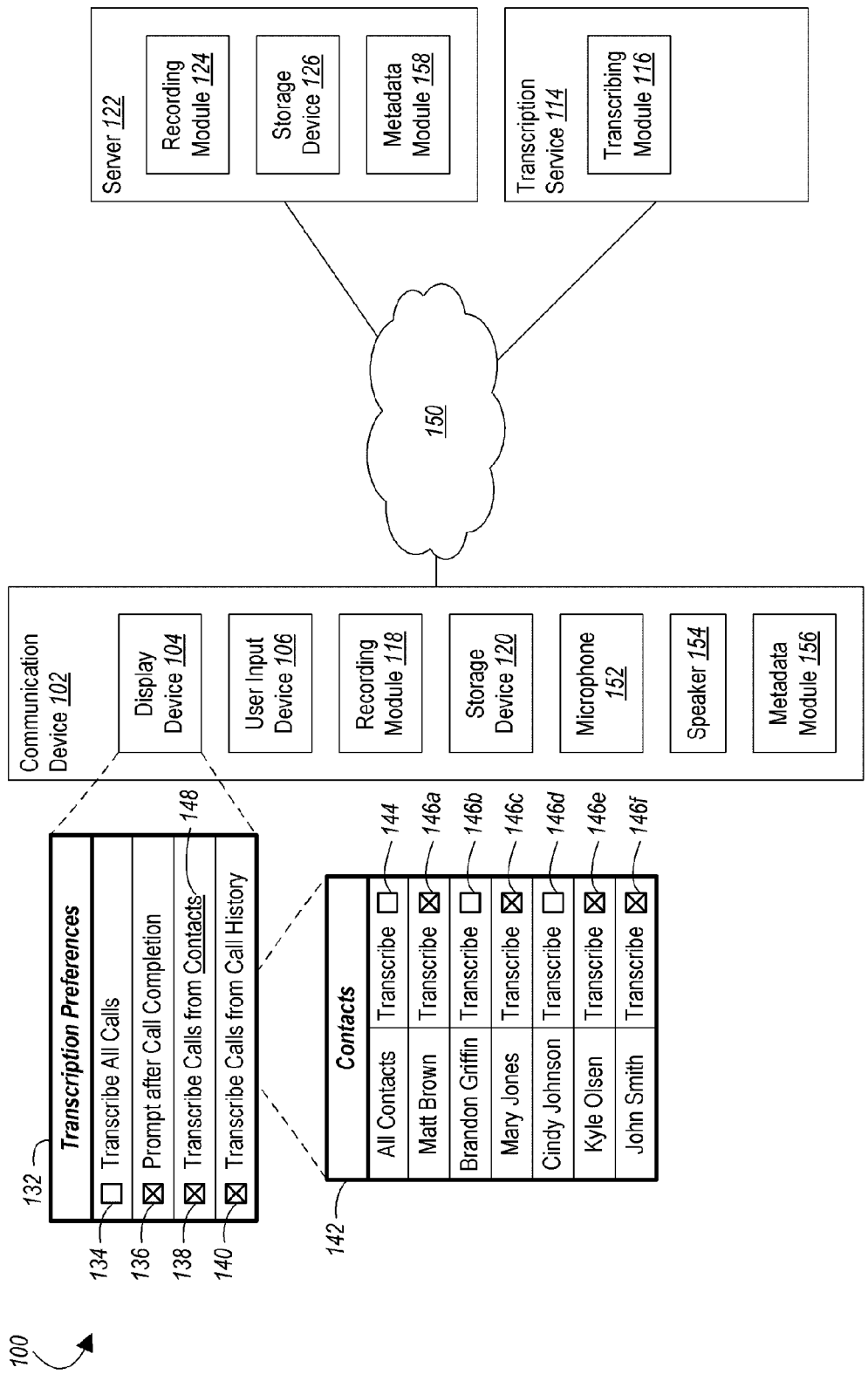
FIG. 4 is a diagram of the communications system shown in FIG. 1, illustrating a still other exemplary user interface.

As shown in FIG. 4, the communication device 102 may be configured to display a user interface 132 in its display device 104. The user interface 132 may include one or more user selection options 134, 136, 138, 140. A user selection of the option 134 may cause audio content of all incoming telephone calls to and/or all outgoing telephone calls from the communication device 102 to be automatically sent to the transcription service 114.

A user selection of the option 138 may cause audio content of all incoming telephone calls to the communication device 102 from at least one user-selected contact and/or all outgoing telephone calls from the communication device 102 to at least one user-selected contact to be automatically sent to the transcription service 114. The user may select the contacts using a contact selection user interface 142. For example, the user may select a user-selectable option 144 to cause audio content of all incoming telephone calls from all of the contacts and/or all outgoing telephone calls to the contacts to be automatically sent to the transcription service 114. Also, for example, the user may select one or more of the user-selectable options 146 to cause audio content of all incoming telephone calls from individual contacts and/or all outgoing telephone calls to those individual contacts to be automatically sent to the transcription service 114. To launch the contact selection user interface 142, a user may select the link 148.

A user selection of the option 136 may configure the communication device 102 to automatically display the user interface 110*a* in response to the telephone call being completed, as discussed above. A user selection of the option 140 may configure the communication device 102 to display the user interface 110*b* in response to a selection of a telephone call from the call history user interface 128, as discussed above.

As discussed above, the audio content of a telephone call may be recorded as one or more audio files, which may be stored on a storage device. The communication device 102 may be configured to automatically delete the audio files in its storage device 120, for example, based on how much of the storage capacity of its storage device 120 is used and/or when the telephone calls' audio files were created. For instance, the audio file of the oldest telephone call may be deleted from the storage device 120 when the storage space allocated for audio files on the storage device 120 is full.

Desirably, a website or other type of web-based interface may still be used to request transcription of a telephone call whose audio file is automatically deleted from the communication device 102, for example, where the audio content of the telephone call is recorded on both storage devices 120, 126, if desired. In particular, the recording module 118 of the communication device 102 may record the audio content of the telephone call as one or more audio files in the storage device 120, and the recording module 124 of the server 122 may also record the audio content of the telephone call as one or more audio files in the storage device 126. Where the server 122 also recorded the audio content of the telephone call in the storage device 126, the user interfaces 110*b*, 128 of the website or other type of web-based interface may be used to request transcription of the telephone call, as discussed above, even after corresponding audio content is automatically deleted from the communication device 102.

Also, even if the server 122 didn't record the audio content of the telephone call, the communication device 102 may (in connection with deleting the audio file from its storage device 126) automatically send a copy of the audio file to the server 122, which may store the file in the storage device 126. The user interfaces 110*b*, 128 of the website or other type of web-based interface may be used to request transcription of the telephone call using the copy sent to the server 122.

If desired, where the audio content of a telephone call is recorded as one or more audio files, metadata may be added to the one or more audio files to help facilitate transcription. For example, the communication device 102 and/or the server 122 may include a metadata module 156, 158 that may be used to add metadata to the one or more audio files. In particular, the metadata module 156, 158 may be configured to automatically add metadata indicating the telephone number of the communication device 102 and/or the telephone number(s) of the other communication device(s) participating in the telephone call. In addition, the metadata module 156, 158 may be configured to automatically identify the contact(s) of the contact list of the communication device 102 that correspond to the telephone number(s) of the other communication device(s) participating in the telephone call. The metadata module 156, 158 may then automatically add metadata indicating contact profile data of the identified contact(s) to the one or more audio files containing the audio content of the telephone call.

Also the metadata module 156, 158 may be configured to add metadata (e.g., the telephone numbers, the contact profile data and/or other metadata) to the one or more audio files in response to manually entered user input. For instance, the communication device 102 may display, during and/or after the telephone call, a user interface configured to receive user input indicating the telephone numbers, the contact profile data and/or other metadata that may facilitate identification of the persons participating in the telephone call. In response, to receiving the user input, the metadata module 156, 158 may add the metadata to the one or more audio files containing the audio content of the telephone call.

In some instances, the communication device 102, the server 122 and/or the server (not shown) of the transcription service 114 may communicate with each other as discussed above using one or more connections and/or networks 150, as shown in FIG. 1. The connections and/or networks 150 may comprise wired connections and/or networks; wireless connections and/or networks; or both.

If desired, the methods and systems described above may include and/or be implemented using special purpose or general purpose telecommunication devices, including but not limited to wireless telephones; other telephony-enabled mobile devices; landline telephones; special purpose or general purpose computers that are adapted to have telecommunications or data networking capabilities (such as personal computers and cable or satellite set-top); and other telecommunication devices.

If desired, the methods and systems described above may include and/or be implemented using computer-readable media for carrying or having computer-executable instructions or electronic content structures stored thereon, and these terms are defined to extend to any such media or instructions that may be used with telecommunication devices or other communication devices.

By way of example, and not limitation, such computer-readable media can comprise RAM, ROM, EEPROM, CD-ROM or other optical disk storage, magnetic disk storage or other magnetic storage devices, or any other medium which can be used to store desired program code in the form of computer-executable instructions or electronic content structures and which can be accessed by a general purpose or special purpose computer, other computing devices, telecommunication devices or other communication devices. If desired, the general purpose or special purpose computer, other computing devices, telecommunication devices or other communication devices may include, for example, system memory and/or one or more processors that may execute the computer-executable instructions.

The methods and systems described above require no particular component or function. Thus, any described component or function—despite its advantages—is optional. Also, some or all of the described components and functions described above may be used in connection with any number of other suitable components and functions.

Although this invention has been described in terms of certain preferred embodiments, other embodiments apparent to those of ordinary skill in the art are also within the scope of this invention. Accordingly, the scope of the invention is intended to be defined only by the claims which follow.

What is claimed is:

1. A method for facilitating the transcription of telephone calls to and from a handheld wireless telecommunication device, the method comprising:

displaying a first user interface in a display device, the first user interface including one or more user-selectable options, the one or more user-selectable options including at least two of the following user-selectable options:

a first user-selectable option that causes audio content of all incoming telephone calls to the handheld wireless telecommunication device from at least one user-selected contact and all outgoing telephone calls from the handheld wireless telecommunication device to at least one user-selected contact to be automatically sent to a transcription service;

a second user-selectable option that causes audio content of all incoming telephone calls to the handheld wireless telecommunication device and all outgoing telephone calls from the handheld wireless telecommunication device to be automatically sent to a transcription service; and a third user-selectable option that configures the handheld wireless telecommunication device to, in response to a first telephone call in which the handheld wireless telecommunication device participated being completed, automatically display a second user interface configured to prompt for user input that indicates a request for a transcription of audio content of the first telephone call.

2. The method as in claim 1, wherein the one or more user-selectable options includes:

the first user-selectable option that causes audio content of all incoming telephone calls to the handheld wireless telecommunication device from at least one user-selected contact and all outgoing telephone calls from the handheld wireless telecommunication device to at least one user-selected contact to be automatically sent to a transcription service;

the second user-selectable option that causes audio content of all incoming telephone calls to the handheld wireless telecommunication device and all outgoing telephone calls from the handheld wireless telecommunication device to be automatically sent to a transcription service; and the third user-selectable option that configures the handheld wireless telecommunication device to, in response to a first telephone call in which the handheld wireless telecommunication device participated being completed, automatically display a second user interface configured to receive user input that indicates a request for a transcription of audio content of the first telephone call.

3. The method as in claim 1, wherein the one or more user-selectable options includes:

a user-selectable option that configures the handheld wireless telecommunication device to, in response to a first telephone call in which the handheld wireless telecommunication device participated being completed, automatically display a second user interface configured to receive user input that indicates a request for a transcription of audio content of the first telephone call.

4. The method as in claim 1, wherein the handheld wireless telecommunication device includes the display device in which the first user interface is displayed.

5. The method as in claim 1, wherein a web-based interface includes the first user interface, the web-based interface hosted by a server remote from the handheld wireless telecommunication device.

6. A method for facilitating the transcription of telephone calls to and from a handheld wireless telecommunication device, the method comprising:

displaying a first user interface in a display device, the first user interface including one or more user-selectable options, the one or more user-selectable options including at least one of the following first second and third user-selectable options:

a first user-selectable option that causes audio content of all incoming telephone calls to the handheld wireless telecommunication device from at least one user-selected contact and all outgoing telephone calls from the handheld wireless telecommunication device to at least one user-selected contact to be automatically sent to a transcription service;

a second user-selectable option that causes audio content of all incoming telephone calls to the handheld wireless telecommunication device and all outgoing telephone calls from the handheld wireless telecommunication device to be automatically sent to a transcription service; and a third user-selectable option that configures the handheld wireless telecommunication device to, in response to a first telephone call in which the handheld wireless telecommunication device participated being completed, automatically display a second user interface configured to prompt for user input that indicates a request for a transcription of audio content of the first telephone call, wherein the one or more user-selectable options further includes:

a fourth user-selectable option that causes audio content of all incoming telephone calls to the handheld wireless telecommunication device from at least one user-selected contact and all outgoing telephone calls from the handheld wireless telecommunication device to at least one user-selected contact to be automatically sent to a transcription service.

7. A method for facilitating the transcription of telephone calls to and from a handheld wireless telecommunication device, the method comprising:

displaying a first user interface in a display device, the first user interface including one or more user-selectable options, the one or more user-selectable options including at least one of the following first second and third user-selectable options:

a first user-selectable option that causes audio content of all incoming telephone calls to the handheld wireless telecommunication device from at least one user-selected contact and all outgoing telephone calls from the handheld wireless telecommunication device to at least one user-selected contact to be automatically sent to a transcription service;

a second user-selectable option that causes audio content of all incoming telephone calls to the handheld wireless telecommunication device and all outgoing telephone calls from the handheld wireless telecommunication device to be automatically sent to a transcription service; and a third user-selectable option that configures the handheld wireless telecommunication device to, in response to a first telephone call in which the handheld wireless telecommunication device participated being completed, automatically display a second user interface configured to prompt for user input that indicates a request for a transcription of audio content of the first telephone call, wherein the one or more user-selectable options includes:
  a fourth user-selectable option that causes audio content of all incoming telephone calls to the handheld wireless telecommunication device and all outgoing telephone calls from the handheld wireless telecommunication device to be automatically sent to a transcription service.

8. A method for facilitating the transcription of telephone calls to and from a handheld wireless telecommunication device, the method comprising:
  displaying a call history user interface on a display device, the call history user interface listing one or more telephone calls in which a handheld wireless telecommunication device participated; and
  displaying, in the display device, a prompt for user input that indicates a request for a transcription of audio content of a telephone call listed in the call history user interface, prior to displaying the call history user interface and the prompt:
    by the handheld wireless telecommunication device, automatically recording and storing the audio content as a first audio file in a storage device of the handheld wireless telecommunication device;
    by a server remote from the handheld wireless telecommunication device, automatically recording and storing the audio content as a second audio file in a storage device of the remote server;
    by the handheld wireless telecommunication device, automatically deleting the first audio file from the storage device of the handheld wireless telecommunication device based on how much of the storage capacity of the storage device of the handheld wireless telecommunication device is used; and
    in response to receiving the user input that indicates a request for a transcription, sending the audio content to a transcription service, wherein sending the audio content to the transcription service comprises the remote server sending the at least one audio file to the transcription service.

9. The method as in claim 8, further comprising:
  in response to receiving the user input that indicates a request for a transcription, sending the audio content to a transcription service;
  wherein the handheld wireless telecommunication device includes a storage device; wherein the handheld wireless telecommunication device automatically recorded and stored the audio content as at least one audio file in the storage device; and wherein sending the audio content to the transcription service comprises the handheld wireless telecommunication device sending the at least one audio file to the transcription service.

10. The method as in claim 8, further comprising:
  in response to receiving the user input that indicates a request for a transcription, sending the audio content to a transcription service;
  wherein a server remote from the handheld wireless telecommunication device includes a storage device; wherein the remote server automatically recorded and stored the audio content as at least one audio file in the storage device; and wherein sending the audio content to the transcription service comprises the remote server sending the at least one audio file to the transcription service.

11. The method as in claim 8, wherein the handheld wireless telecommunication device includes the display device that displays the user interface and the prompt.

12. The method as in claim 8, wherein a web-based interface includes the user interface and the prompt, the web-based interface hosted by a server remote from the handheld wireless telecommunication device.

13. The method as in claim 8, wherein the handheld wireless telecommunication device includes the display device that displays the user interface and the prompt.

14. The method as in claim 8, wherein a web-based interface includes the user interface and the prompt, the web-based interface hosted by a server remote from the handheld wireless telecommunication device.

15. A method for facilitating the transcription of telephone calls to and from a handheld wireless telecommunication device, the method comprising:
  displaying a call history user interface on a display device, the call history user interface listing one or more telephone calls in which a handheld wireless telecommunication device participated; and
  displaying, in the display device, a prompt for user input that indicates a request for a transcription of audio content of a telephone call listed in the call history user interface, prior to displaying the call history user interface and the prompt:
    by the handheld wireless telecommunication device, automatically recording and storing the audio content as a first audio file in a storage device of the handheld wireless telecommunication device;
    by the handheld wireless telecommunication device, automatically sending the audio content to a server remote from the handheld wireless telecommunication device based on how much of the storage capacity of the storage device of the handheld wireless telecommunication device is used;
    by the remote server, automatically receiving the audio content and storing the received audio content as a second audio file in a storage device of the remote server;
    by the handheld wireless telecommunication device, automatically deleting the first audio file from the storage device of the handheld wireless telecommunication device based on how much of the storage capacity of the storage device of the handheld wireless telecommunication device is used;
    in response to receiving the user input that indicates a request for a transcription, sending the audio content to a transcription service, wherein sending the audio content to the transcription service comprises the remote server sending the at least one audio file to the transcription service.

16. The method as in claim 15, wherein the handheld wireless telecommunication device includes the display device that displays the user interface and the prompt.

17. The method as in claim 15, wherein a web-based interface includes the user interface and the prompt, the web-based interface hosted by a server remote from the handheld wireless telecommunication device.

* * * * *